Aug. 31, 1926.
B. W. LANCE ET AL
1,598,482
RADIUS ROD BALL SHIM
Filed May 26, 1923
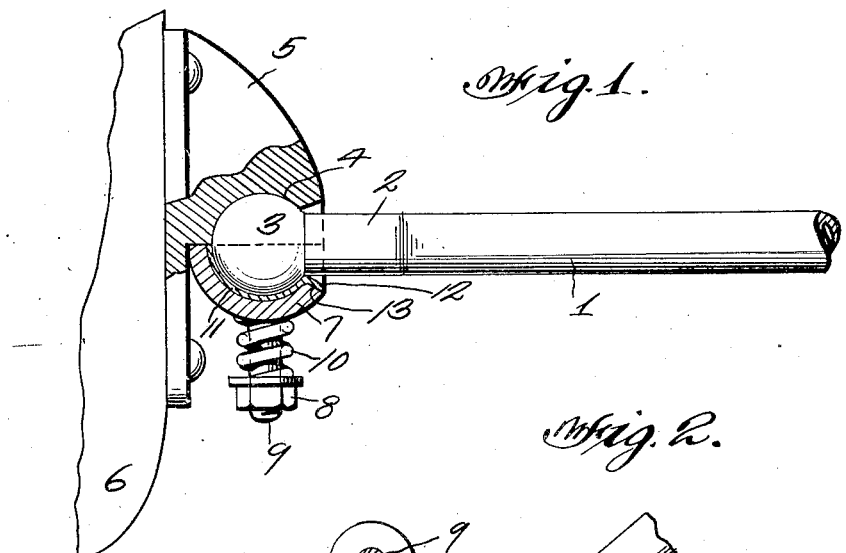
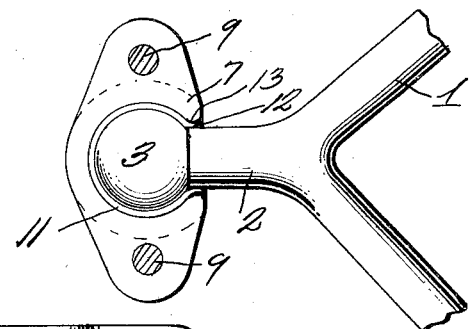
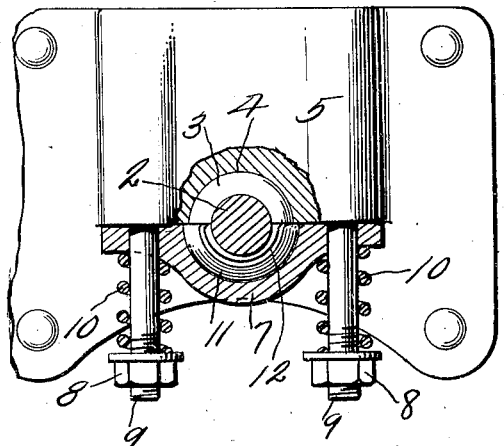
Inventors
B. W. Lance
C. M. Hanson
By D. Swift
Attorney Patented Aug. 31, 1926.

1,598,482

UNITED STATES PATENT OFFICE.

BENJAMIN W. LANCE AND CHARLES M. HANSON, OF GENEVA, ILLINOIS.

RADIUS-ROD-BALL SHIM.

Application filed May 26, 1923. Serial No. 641,781.

The invention relates to shims for the balls of radius rods used in connection with automobiles, and has for its object to provide a substantially semi-spherical shim adapted to be placed within the cap which holds the ball of the radius rod in its socket and to take up the wear within said cap and socket, thereby eliminating rattling and play.

A further object is to provide the shim with a recess in one side thereon, through which a portion of the radius rod neck extends, said recess having a flange adapted to engage within the semi-circular recess of the cap.

A further object is to provide a shim substantially semi-circular shaped and adapted to be disposed within the socket of a ball and socket joint for taking up play therein, especially ball and socket joints used in connection with automobiles, particularly radius rod joints and drag link joints.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the rear end of the front radius rod of an automobile, showing the ball thereof disposed in the socket and the socket and shim in section.

Figure 2 is a top plan view of the rear end of the radius rod, showing the ball disposed in the cap.

Figure 3 is a front elevation of the socket bracket, showing the cap in section, and the shim disposed therein.

Figure 4 is a perspective view of the shim.

Referring to the drawing, the numeral 1 designates the rear end of a conventional form of radius rod and 2 the rearwardly extending neck thereof. The neck 2 terminates in a ball 3, which ball is disposed in the socket 4 of the bracket 5. Bracket 5 is in turn secured to the crank case 6 in the usual manner. It has been found that the socket 4 as well as the removable cap 7 wear incident to constant use, thereby allowing movement of the radius rod as a whole. Where movement develops, the front axle is not properly braced and at the same time a constant rattling is heard during the operation of the automobile. When play develops in the ball and socket joint the nuts 8 are removed from the bolts 9, after which the springs 10 are removed, thereby allowing the removal of the cap 7 downwardly to a position where the semi-spherical shim 11 may be placed therein. The shim 11, when the cap is again placed in position receives the ball 3 and takes up the play thereof, consequently preventing rattling and positively bracing the axle of the automobile. The forward side of the shim 11 is provided with a semi-circular shaped flange 12, which flange engages the semicircular shaped recess 13 in the cap 7. Shim 11 may be formed from any suitable material and of any thickness desired. However it is preferably formed from thin material so that it will easily conform to the curvature of the ball 5 or the curvature of the inner surface of the cap 7 and socket 4.

From the above it will be seen that a shim is provided for radius rod ball and socket joints, that the shim is simple in construction, may be easily applied in such a manner as to take up play in the ball and socket joints and the shim may be used in connection with ball and socket joints of various kinds.

The invention having been set forth what is claimed as new and useful is:—

The combination with a radius rod ball and socket joint, said ball and socket joint comprising a fixed member having a semi-spherical socket, a ball disposed within the semi-spherical socket, a spring means actuating a cap plate engaging said ball at one side thereof and having a semi-spherical depression therein of greater radius than the first mentioned socket, the forward side of said cap plate being provided with a bevelled recess, of a semi-spherical shim disposed in the depression of the cap plate, the annular edge of the shim engaging the under side of the semispherical socket, said shim being provided with an integral flange segmentally shaped and engaging the wall of the bevelled recess, the inner radius of the shim being the same as the radius of the socket of the fixed member.

In testimony whereof we have signed our names to this specification.

CHARLES M. HANSON.
BENJAMIN W. LANCE.